(12) United States Patent
Jun et al.

(10) Patent No.: US 11,071,015 B2
(45) Date of Patent: Jul. 20, 2021

(54) ACCESS TRAFFIC STEERING/SWITCHING/SPLITTING METHOD IN A NETWORK AND NETWORK ENTITY PERFORMING THE SAME

(71) Applicant: Electronics and Telecommunications Research Institute, Daejeon (KR)

(72) Inventors: Sun Mi Jun, Daejeon (KR); Young Il Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 46 days.

(21) Appl. No.: 16/426,987

(22) Filed: May 30, 2019

(65) Prior Publication Data

US 2019/0373505 A1    Dec. 5, 2019

(30) Foreign Application Priority Data

May 30, 2018   (KR) .................... 10-2018-0062106
May 23, 2019   (KR) .................... 10-2019-0060566

(51) Int. Cl.
| | | |
|---|---|---|
| *H04W 28/08* | (2009.01) | |
| *H04W 76/27* | (2018.01) | |
| *H04W 8/08* | (2009.01) | |
| *H04W 80/10* | (2009.01) | |

(52) U.S. Cl.
CPC .............. *H04W 28/08* (2013.01); *H04W 8/08* (2013.01); *H04W 76/27* (2018.02); *H04W 80/10* (2013.01)

(58) Field of Classification Search
CPC ....... H04W 28/08; H04W 76/27; H04W 8/08; H04W 80/10
See application file for complete search history.

(56) References Cited

U.S. PATENT DOCUMENTS

| | | | |
|---|---|---|---|
| 10,075,379 B2 | 9/2018 | Jung et al. | |
| 10,306,500 B2 | 5/2019 | Jeong et al. | |
| 2014/0287753 A1 | 9/2014 | Schulist et al. | |
| 2018/0123660 A1 | 5/2018 | Jung et al. | |
| 2018/0152248 A1 | 5/2018 | Sung | |
| 2018/0262924 A1* | 9/2018 | Dao .................. | H04W 72/1257 |
| 2018/0331944 A1* | 11/2018 | Salkintzis ............... | H04L 45/38 |
| 2019/0238468 A1* | 8/2019 | Kadel ..................... | H04L 47/24 |
| 2019/0260811 A1* | 8/2019 | Kim ....................... | H04W 76/16 |
| 2019/0313477 A1* | 10/2019 | Kim ....................... | H04W 76/32 |
| 2020/0128432 A1* | 4/2020 | Youn ...................... | H04L 47/805 |
| 2020/0178196 A1* | 6/2020 | Wang ..................... | H04W 48/18 |
| 2020/0236727 A1* | 7/2020 | Salkintzis ............... | H04L 67/14 |

FOREIGN PATENT DOCUMENTS

| | | |
|---|---|---|
| KR | 1020150123747 A | 11/2015 |
| KR | 1020170019153 A | 2/2017 |

* cited by examiner

*Primary Examiner* — Ajay Cattungal
(74) *Attorney, Agent, or Firm* — Rabin & Berdo, P.C.

(57) ABSTRACT

A method for access traffic steering, switching, and splitting (ATSSS) in a network and a network entity for performing the method are disclosed. When the execution of the ATSSS from the first access network to the second access network is determined, a first message requesting the SMF to confirm the connection state of the terminals for the first access network and the second access network may be transmitted to AMF. The SMF may receive information on the connection state of the terminal from the AMF.

18 Claims, 11 Drawing Sheets

ACCESS TRAFFIC STEERING/SWITCHING/SPLITTING METHOD IN A NETWORK AND NETWORK ENTITY PERFORMING THE SAME

CROSS-REFERENCE TO RELATED APPLICATION

This application claims priority to and the benefit of Korean Patent Applications No. 10-2018-0062106 filed in the Korean Intellectual Property Office on May 30, 2018 and No. 10-2019-0060566 filed in the Korean Intellectual Property Office on May 23, 2019, the entire contents of which are incorporated herein by reference.

BACKGROUND OF THE INVENTION

(a) Field of the Invention

This relates to a method for ATSSS in a network and a network entity performing the same.

(b) Description of the Related Art

The 5G network architecture allows terminals to access multiple access networks at the same time, providing a common core network regardless of the type of access network. When a user accesses different access networks at the same time and wants to transmit and receive traffic, a technique is required that can select an access network matching the traffic attribute. The traffic mobility technology can provide users with more economical data transmission services and increase the transmission capacity available to users. In addition, the user can change the access network which provides the current service arbitrarily, thereby further enhancing the user's convenience.

Recently, standardization of 5G network technology is under way. In 5G network, a standardization process is underway to support access traffic steering, switching, and splitting (ATSSS) between the 3GPP access network and the Non-3GPP access network.

Traffic steering refers to the ability to deliver new data traffic through a new access network, and traffic switching refers to the ability to transfer all currently transmitted data traffic to another access network. Traffic splitting refers to the ability to distribute data traffic through a plurality of access networks.

In order to provide traffic (data, voice, etc.) to user equipment (UE) in the 5G network, a packet data unit (PDU) session is basically established between a user terminal and a data network. When the service is completed, the corresponding PDU session is released.

Existing PDU session is established only through the terminal and one access network (3GPP access network or Non-3GPP access network), whereby a single access PDU session (SA PDU Session) can be established. A plurality of single access PDU sessions (SA PDU sessions) can be established for one UE, and each of a plurality of single access PDU sessions can be distinguished using PDU session identifiers. When service provision is terminated for the terminal or modification of the user traffic session is required, the established PDU session may be triggered to be modified or released by the terminal or a network.

However, since an existing single access PDU session (SA PDU Session) is established for only one access network, user traffic belonging to the corresponding PDU session cannot be transmitted and received through two or more access networks. Accordingly, it is difficult to provide a service supporting the ATSSS function. In order to support the ATSSS function, the same PDU session created over two or more access networks is required. This PDU session is called a Multi-Access PDU Session (MA PDU Session).

SUMMARY OF THE INVENTION

A method for effectively performing ATSSS and a network entity for performing the ATSSS are provided.

Also a method for switching the connection state of a terminal for an access network to perform ATSSS is provided.

According to an exemplary embodiment, a method for performing ATSSS (Access Traffic Steering, Switching and Splitting) in a network is provided. The method includes: transmitting, by a session management function (SMF), a first message requesting for checking connection state of a terminal for a first access network and a second access network to an access and mobility management function (AMF) when an execution of the ATSSS from the first access network to the second access network is determined; and receiving, by the SMF, information on the connection state of the terminal from the AMF.

When the connection state for the second access network is CM (Connection Management) _IDLE state, a control plane for the second access network may be activated; and a user plane for the second access network is activated after the control plane may be activated.

The method may further include performing a modification of a packet data unit (PDU) session for the ATSSS.

The first message may include a packet data unit (PDU) session modification command message, and the PDU session modification command message may include an updated ATSSS rule.

When the connection state for the second access network is CM (Connection Management) _IDLE state, a control plane for the second access network may be activated and a user plane for the second access network may be activated after the control plane is activated, and the method may further include transmitting, by the AMF, an N2 Session Request message including the PDU Session Modification command message to the first access network or the second access network.

The method may further include sending, by the AMF through the first access network, the PDU session modification command message to the terminal.

The PDU session modification command message may include an indicator indicating the ATSSS and the updated ATSSS rule.

The method may further include performing, by the terminal, a radio resource control (RRC) resume procedure when the connection state for the second access network is CM (Connection Management) _CONNECTED state and the RRC state of the second access network is RRC_INACTIVE state.

The method may further include performing, by the terminal, a re-connection for the second access network when the connection state for the second access network is CM_IDLE state.

The method may further include transmitting, by the terminal, a PDU Session Modification Request acknowledgment (ACK) message to the AMF.

The receiving may include receiving, by the SMF from the AMF, an Namf_comm_N1N2Message response message including the information.

The first message may further include at least one of an indicator indicating the check of the connection state, a type of the first access network, a type of the second access network, and a PDU session identifier (ID) associated with the ATSSS.

The first message may be an Namf_Comm_N1N2MessageTransfer message.

According to another exemplary embodiment, a method for performing ATSSS (Access Traffic Steering, Switching and Splitting) in a network is provided. The method includes: determining that a Session Management Function (SMF) changes a traffic of a first access network to a second access network for the ATSSS, transmitting, by the SMF, a second message including a first message for the ATSSS request to an Access and Mobility Management Function (AMF); and receiving, by the SMF, information on a connection state for the terminal from the AMF.

The method may further include transmitting, by the AMF, the first message to the terminal through the first access network.

The method may further include transmitting, by the terminal, a service request message to the AMF through the second access network when a connection state of the terminal to the second access network is CM (Connection Management) _IDLE state.

The first message may be a packet data unit (PDU) session modification command message, and the PDU session modification command message may include at least one of a type of the first access network, a type of the second access network, and a PDU session identifier associated with the ATSSS.

According to yet another exemplary embodiment, a network entity for performing ATSSS (Access Traffic Steering, Switching and Splitting) in a network is provided. The network entity includes: a processor configured to determine a performance for the ATSSS and configure a first message requesting check of a connection state of a terminal to an access network associated with the ATSSS, a network interface configured to transmit the first message to another network entity in the network and receive information on the connection state of the terminal from the another network entity.

The network entity may be a Session Management Function (SMF), and the another network entity may be an Access and Mobility Management Function (AMF).

The first message may be an Namf_Comm_N1N2MessageTransfer message, the Namf_Comm_N1N2MessageTransfer message may include a PDU session modification command message, and the PDU session modification command message may include an updated ATSSS rule.

DETAILED DESCRIPTION OF THE EMBODIMENTS

Figure 1:
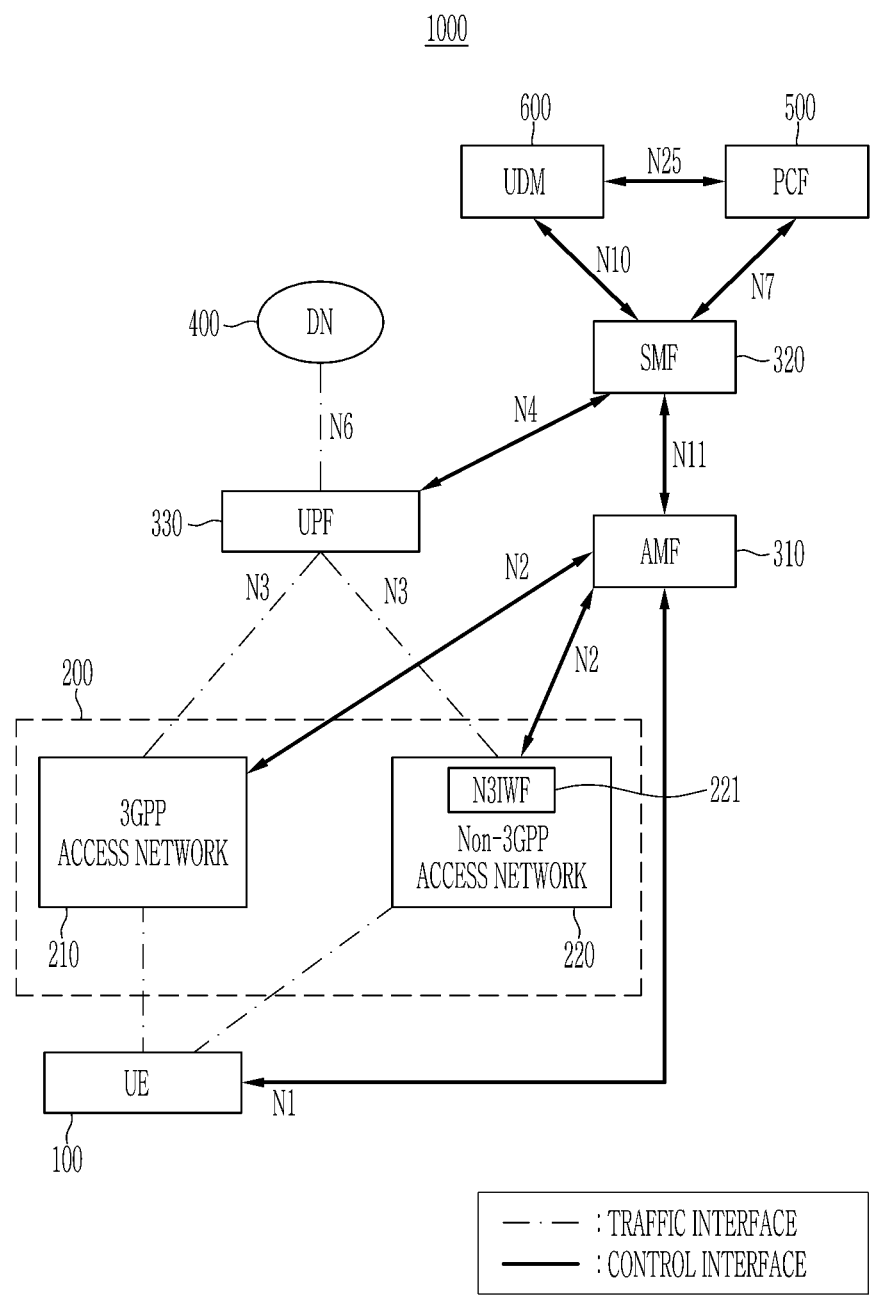
FIG. 1 is a diagram illustrating a 5G network according to an embodiment.

Hereinafter, exemplary embodiments of the present disclosure will be described in detail with reference to the accompanying drawings so that those skilled in the art may easily practice the present disclosure. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, a terminal may be called user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

FIG. 1 is a diagram illustrating a 5G network according to an embodiment.

Referring to FIG. 1, a 5G network 1000 according to an embodiment includes a UE 100, an Access Network (AN) 200, an Access and Mobility Management Function (AMF) 310, a Session Management Function (SMF) 320, a User Plane Function (UPF) 330, a Data Network (DN), a Policy Control Function (PCF) 500, and a Unified Data Management (UDM) 600.

The UE 100 may access the network through an access network (200). The access network 200 includes a 3GPP access network 210 and a Non-3GPP access network 220. The UE 100 may access to the cellular mobile radio access network through the 3GPP access network 210. In addition, the UE 100 may access the wireless LAN through the non-3GPP access network 220. The Non-3GPP access network 220 includes a Non-3GPP InterWorking Function (N3IWF) 221 for the N3 interface and N2 interface with the UPF 330 and the AMF 310 according to the 5G core network common interface principle.

The AMF 310 and the SMF 320 are network entities which process control signals. The AMF 310 and the SMF 320 have an N1 interface which is a non-access stratum (SN) signal interface in correspondence with the UE 100. The AMF 310 performs authentication, connection, and mobility control functions through the N1 interface. The SMF 320 has a session control function (setup/modification/release of the session) through the N1 interface with the UE 100 and the N4 interface with the UPF 330.

The UPF 330 is a network entity of the data plane which collectively accommodates the multiple access networks 210 and 220 through the N3 interface. The UPF 330 connects the data plane between the multiple access networks 210 and 220 and the DN 400 so that traffic of the UE 100 (i.e., user) can be transmitted and received.

The UPF 330 and the access network 200 may receive control rules for the traffic between the UE 100 and the UPF 330 through the interface N4 and the interface N2 from the SMF 320 respectively, and may perform traffic sensing, routing, and QoS control according to the received control rules.

The PCF 500 is connected to the SMF 320 through an N7 signal interface, and may control policies related to the session, the mobility, and the QoS. The PCF 500 may send the Policy and Charging Control Rule (PCC) policy required by the SMF 320 to generate the ATSSS rule to the SMF 320.

The UDM 600 is connected to the SMF 320 through an N10 signal interface and may manage user information management such as subscription information of the UE 100 and policies for each UE. The UDM 600 may send information about the profile and subscription of the UE 100 for the ATSSS to the SMF 320.

As described above, the 5G network system according to the embodiment is an integrated structure that accommodates the 3GPP access network 210 and the Non-3GPP access network 220 at the same time. In such an integrated structure, the terminal can simultaneously access the two access networks 210 and 220 to receive services. ATSSS is a service that steers, switches, and splits an access network associated with traffic to another access network. The core network may determine to change the access network from the first access network to the second access network by selecting traffic perform the ATSSS. Here, the change of the access network may mean an RAT (Radio Access Technology) switching. Hereinafter, for the convenience of description, it is assumed that the 3GPP access network 210 is a 'first access network' and the Non-3GPP access network 220 is a 'second access network'. In addition, for the sake of explanation, it is assumed that the traffic is routed from the first access network 210 to the second access network 220 through the traffic steering, the traffic is switched between the first access network 210 and the second access network 220 through the traffic switching, and the traffic is simultaneously transmitted via the first access network 210 and the second access network 220 through the traffic splitting.

When determining to perform the ATSSS by the core network, it is necessary to check the connection state of the access network 200 associated with the terminal 100. Further, the activation of the control plane and the user plane for all access networks 200 participating in the ATSSS may be needed. Hereinafter, a method for performing the ATSSS will be described.

In the ATSSS method according to an embodiment, a network connection state and a wireless activation state for each access network of the terminal may be checked in order to perform the ATSSS from the first access network to the second access network, thereby performing traffic movement.

Figure 2:
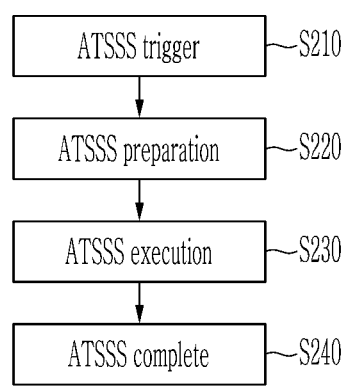
FIG. 2 is a flowchart illustrating an ATSSS method according to an embodiment.

FIG. 2 is a flowchart illustrating an ATSSS method according to an embodiment.

First, the core network determines to perform the ATSSS and invokes a service to inform the AMF 310 that the ATSSS is started (S210). For example, the SMF 320 may trigger the performance of the ATSSS and inform the start of the ATSSS to the AMF 310.

The AMF 310 prepares the connection state of the terminal for the access network 200 which is determined to perform the ATSSS and the core network, the UE 100, and the access network 200 prepare the ATSSS (S220).

Signaling procedures for performing the ATSSS between the core network, the UE 100, and the access network 200 are performed (S230).

After completing the signaling procedures in step S230, the access path of the traffic is changed and the ATSSS service is started (S240). That is, the ATSSS is completed.

There are two schemes in which the SMF 320 determines to perform the ATSSS and invokes the service to inform the AMF 310 of the ATSSS preparation.

In a first scheme of the two schemes, a control message including an updated ATSSS rule is transmitted to the UE 100 after the access network 200 participating in the ATSSS is activated. This is explained in more detail in FIG. 3 below.

In a second scheme of the two schemes, the control message including the updated ATSSS rule is first transmitted to the UE 100, and then the control plane and the data plane of the access network 200 participating in the ATSSS are activated. This is described in more detail below in FIG. 9 below.

Figure 3:
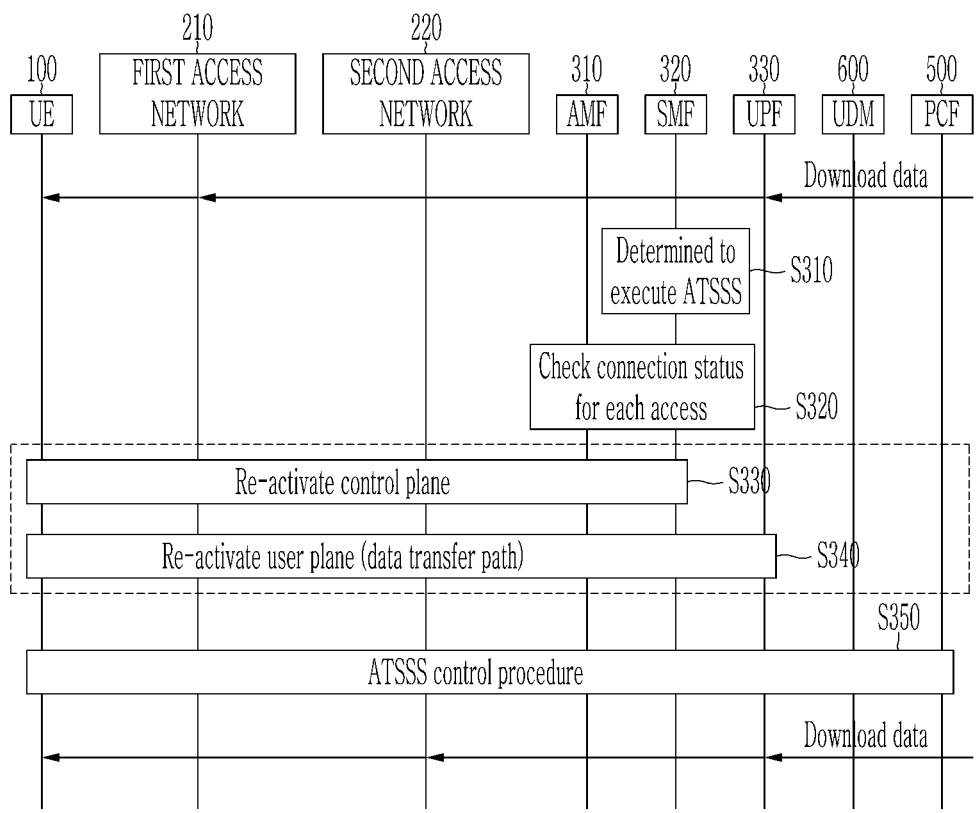
FIG. 3 is a flowchart illustrating an ATSSS method according to the first embodiment.

FIG. 3 is a flowchart illustrating an ATSSS method according to the first embodiment.

The ATSSS method illustrated in FIG. 3 is a method in which a control plane activation procedure and a user plane activation procedure for the access network of the terminal are firstly performed, and then the ATSSS control procedure is performed in order to perform the ATSSS according to a request of the core network. The ATSSS method of FIG. 3 is described in more detail in FIG. 6.

First, the SMF 320 determines to perform the ATSSS (S310).

The SMF 320 requests the AMF 310 to check the connection state (i.e., CM (Connection Management) _CONNECTED or CM_IDLE) of the terminal for the access networks 210 and 220 (S320). To this end, the SMF 320 performs a service invoke to the AMF 310, and the service invoking method may use the following three methods.

In the first service invoking method, when the SMF 320 transmits the N1 message for the terminal 100 to the AMF 310, the SMF 320 may transmit a connection state inquiry or an activation request for each access network 210 and 220 together with the N1 message. Here, the Namf_Comm_N1N2MessageTransfer (Network interface AMF Communication N1N2MessageTransfer) message may be used. This first service invoking method will be described in more detail in FIG. 4 below.

In the second service invoking method, the connection state inquiry or the activation request for each access network 210, 220 may be performed before the SMF 320 transmits the N1 message to be transferred to the UE 100 via the AMF 310. Here, the Namf_Comm_UEContextTransfer (Network Interface AMF_Communication_UEContext- Transfer) message may be used. This second service invoking method will be described in more detail in FIG. 5 below.

The third service invoking method is a method in which the SMF 320 requests the connection state inquiry for each access network 210 and 220 to the AMF 310 and does not request the activation request based on the policy of the network and the terminal.

In step S320, when the SMF 320 performs the service invoke to the AMF 310, the SMF 320 may transmit to the AMF 310 a message including at least one of an indicator (ATSSS_Indication) indicating the ATSSS execution, a source packet data unit (PDU) session ID, a target PDU session ID, a source access network type (source AN type), and a target access network type (target AN type). Here, when the PDU session set in the UE 100 is a multi-access (MA) PDU session, the source PDU session ID and the target PDU session ID may be set to the same ID and one of them may be omitted. The source access network type may be set to the first access network (3GPP access network) and the target access network type may be set to the second access network (Non-3GPP access network).

Figure 4:
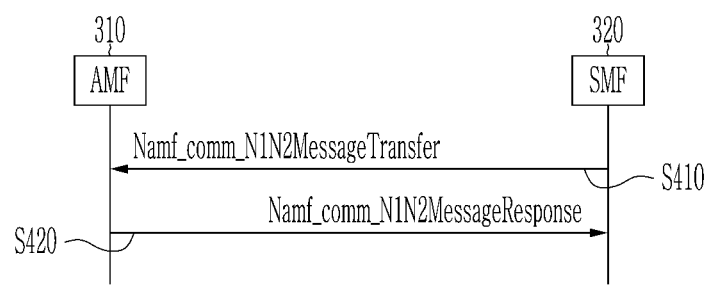
FIG. 4 is a flowchart illustrating a service invoking method according to an embodiment.

FIG. 4 is a flowchart illustrating a service invoking method according to an embodiment. That is, FIG. 4 is the first service invoking method.

As shown in FIG. 4, the SMF 320 which determines to perform the ATSSS transmits the Namf_Comm_N1N2MessageTransfer message to the AMF 310 (S410). Here, the Namf_Comm_N1N2MessageTransfer message includes at least one of ATSSS_indication, the source PDU session ID, the target PDU session ID, the source access network type (source AN type), the target access network type (target AN type), the N1 message, and an control plane re-activation policy (CP (control plane) _reactivation policy). Here, the N1 message is a message including the updated ATSSS rule and a request of performance of the ATSSS, and may be a PDU session modification command message. The control plane re-activation policy (CP_reactivation policy) is a control plane reactivation policy for each access network. If this policy does not exist, the predefined basic policy may be replaced.

When the AMF 310 receives the Namf_Comm_N1N2MessageTransfer message in step S410, the AMF 310 inquires the connection state for the access network (i.e., the access type) related to the PDU session ID to the terminal and transmits the Namf_comm_N1N2MessageResponse message including the inquiry result (S420). Here, the AMF 310 may switch the connection state to CM_CONNECTED by activating the connection of the UE to the target access network when the connection state of the terminal with respect to the target access network is CM_IDLE. Then, the AMF 310 transmits the N1 message (for example, the PDU session command modification message) instructing performance of the ATSSS and the updated ATSSS rule to the UE 100.

Figure 5:
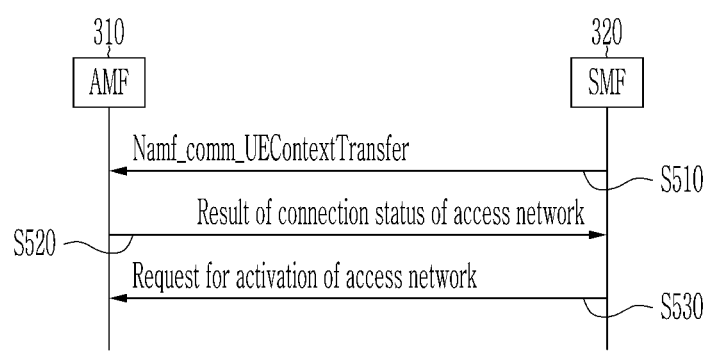
FIG. 5 is a flowchart illustrating a service invoking method according to another embodiment.

FIG. 5 is a flowchart illustrating a service invoking method according to another embodiment. That is, FIG. 5 shows the second service invoking method.

As shown in FIG. 5, the SMF 320 that has determined to perform the ATSSS transmits a Namf_Comm_UEContextTransfer message to the AMF 310 (S510). Here, the Namf_Comm_UEContextTransfer message may include the ATSSS_indication, the source PDU session ID, the target PDU session ID, the source access network type (source AN type), and the target access network type (target AN type) as a first input type. Alternatively, the Namf_Comm_UEContextTransfer message may include a status inquiry indicator (GET_ACCESS_CM_STATE) for each access, the source PDU session ID, the target PDU session ID, the source access network type (source AN type), and the target access network type (target AN type) as a second input type.

When receiving the Namf_Comm_UEContextTransfer message including the first input type in step S510, the AMF 310 may perform the connection state inquiry of the access network 200 by using the ATSSS_Indication and activate the connection state of the UE 100. Alternatively, when receiving the Namf_Comm_UEContextTransfer message including the second input type in step S510, the AMF 310 may perform the connection state inquiry of the access network 200 by using the status inquiry indicator (the GET_ACCESS_CM_STATE) for each access.

The AMF 310 inquires the connection state of the access network 200 and transmits the inquiry result to the SMF 320 (S520). When it is determined that there is a network which is not connected to the access network based on the received connection state result, the SMF 320 requests the AMF 310 to activate the corresponding access network (S530).

Next, referring to FIG. 3, reactivation of the control plane is performed (S330). For example, the UE 100 activates each access network to change its state into the connected state. When the connection state to each access network 200 is an inactive state (IDLE), the AMF 310 requests the UE 100 to establish a connection to the AMF through the corresponding access network. The UE 100 connects to the network using a service request procedure through the corresponding access network (i.e., the inactive access network) and provides with location information of the UE 100 (i.e., the node information of the connected access network) for each access network. The AMF 310 then switches the connection state for each access network of the UE 100 to the network CM_CONNECTED state.

On the other hand, there may be different policies (i.e., the control plane re-activation policy) for the access network of the UE. For example, when the UE 100 receives the re-activation command for the access network from the AMF 310, the UE 100 does not perform the re-establishment process according to the reactivation policy or the re-establishment process may be performed only for the selected access network. In this embodiment, the control plane reactivation policy may include three policies. In a first policy, the UE 100 may activate the control plane for all access networks, thereby making the UE's connection states for all access networks into the CM_CONNECTED state. As a second policy, in a master/slave access network structure, the UE 100 may activate only the control plane for the master access network to make the UE's connection state for the master access network into the CM_CONNECTED state. As a third policy, the UE 100 may activate only the control plane for the access network selected by the core network, thereby making the UE's state for the network into the CM_CONNECTED state. According to the above three policies, the UE 100 establishes the connection through the selected access network. The control signal message for ATSSS execution in step S350 is exchanged through the control plane path activated in step S330.

In step S340, the user plane is activated, so that the UE 100 performs a data transmission on the path of the access network that has been re-established in step S330. A RRC connection is reconfigured between the UE 100 and the re-established access network, and an N3 tunnel between the re-established access network and the UPF 330 is set.

After the preparation for the ATSSS is completed in steps S330 and S340, a control procedure for the ATSSS is performed (S350). In this embodiment, the core network requests the UE 100 to change the data transmission rule for performing the ATSSS from the first access network 210 to the second access network 220 by transmitting the N1 message to the UE 100. The core network then requests the first access network 210 and the second access network 220 to modify (add/delete/change) the amount of resources associated with the traffic being changed.

Figure 6:
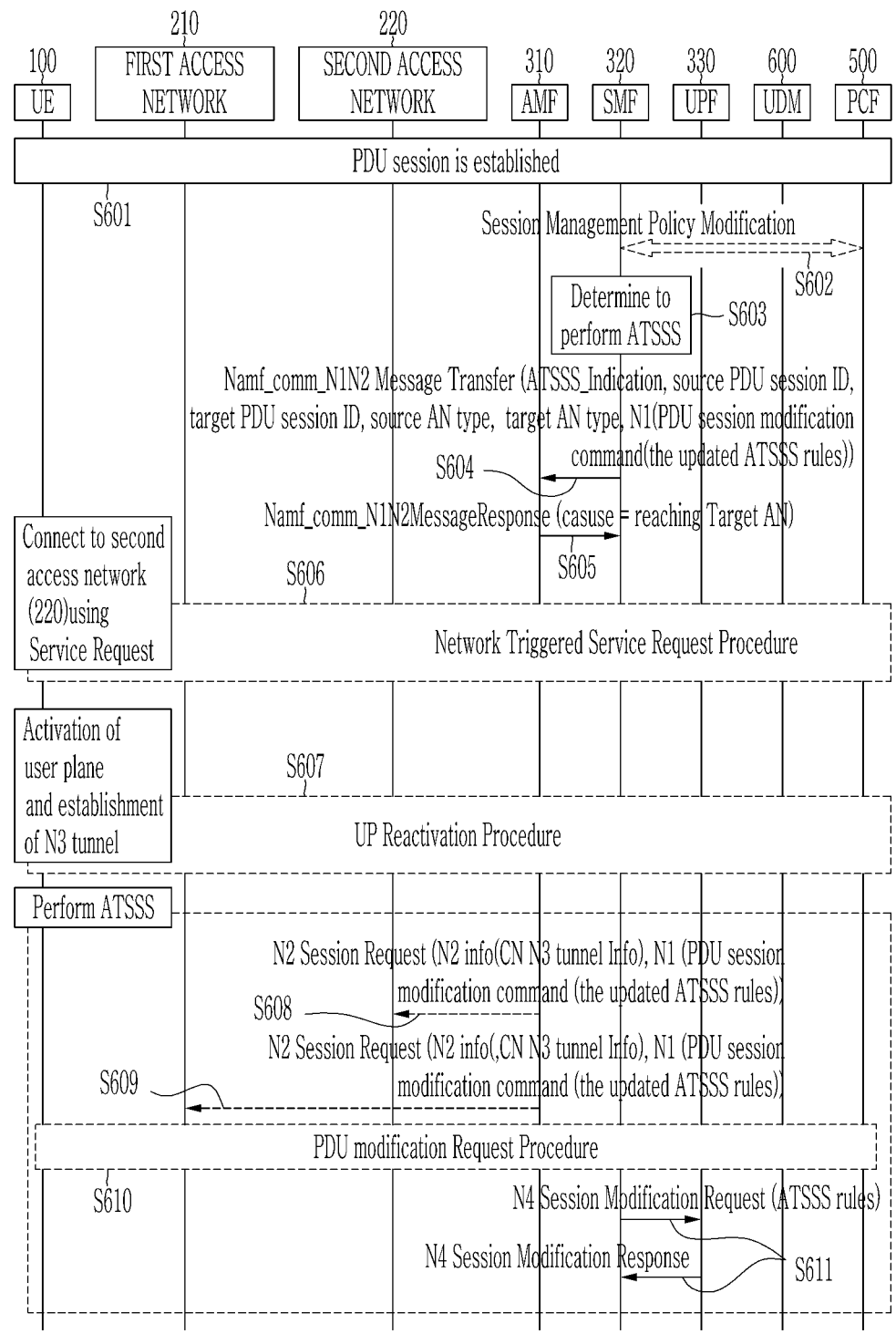
FIG. 6 is a flowchart showing the ATSSS method of FIG. 3 in detail.

FIG. 6 is a flowchart showing the ATSSS method of FIG. 3 in detail.

In the ATSSS method of FIG. 6, before the PDU session modification procedure, the connection states of the first access network 210 and the second access network 220 are checked and the service request procedure is performed in order that the connection state of the UE through the access network is changed from the CM_IDLE state to the CM_CONNECTED state.

First, it is assumed that a PDU session is established through a PDU session establishment procedure (S601). In this case, the UE 100 may establish the PDU session through the first access network 210 and the second access networks 220, and the PDU session may be an MA (Multi-access) PDU session. PDU session establishment procedure will be apparent to those skilled in the art, and therefore, details are not described here.

The change of the session management policy may be performed by the PCF 500 or the UDM 600 (S602). The following step S603 may be performed by changing the session management policy.

The SMF 320 determines to perform the ATSSS (S603). There are various conditions under which the SMF 320 determines to perform the ATSSS. The SMF 320 may determine to perform the ATSSS when a monitored load on an access network exceeds a predetermined threshold value. The SMF 320 may determine to perform the ATSSS when it is requested to change the ATSSS rule from the PCF 500 or the UDM 600 in step S602. Alternatively, when the downlink traffic arrives at the UPF 330 from the DN 400 but the connection state of the first access network 210 of the PDU session is not the CM_CONNECTED state, the SMF 320 may determine to perform the ATSSS for transmitting the downlink traffic by changing the access network to the second access network 220.

In FIG. 6, for convenience of explanation, it is assumed that the SMF 320 determines to perform the ATSSS by changing from the first access network 210 to the second access network 220.

When the SMF 320 determines to perform the ATSSS at step S603, the SMF 320 transmits a Namf_Comm_N1N2MessageTransfer message to the AMF 310 (S604). In this embodiment, the Namf_Comm_N1N2MessageTransfer message may include the ATSSS_indication, the source PDU session ID, the target PDU session ID, the source access network type (source AN type), the target access network type (target AN type), and the N1 message. The ATSSS_indication is an indicator for instructing the AMF 310 to prepare a connection establishment for each access network before starting the ATSSS. The source PDU session ID and the target PDU session ID identify the PDU session for which the ATSSS is to be performed. The source PDU session ID and the target PDU session ID may be the same identifier for a MA PDU session, or may be different identifiers for separated PDU sessions. The source access network type may be set to a first access network (3GPP access network) and the target access network type may be set to a second access network (Non-3GPP access network). Meanwhile, the N1 message transmitted to the UE 100 includes modified (updated) ATSSS rules, and the N1 message may be a PDU session modification command message. A modified (updated) ATSSS rule may be included within the N1 message (e.g., a PDU session modification command message) or outside of the N1 message. The ATSSS rule is the path rule for the access traffic to be switched. In this embodiment, the access traffic may be IP flow information, a Service Data Flow (SDF), a Quality of Service Flow Identifier (QFI), or PDU session itself. The ATSSS rule is a rule for selecting an access network when the traffic is transmitted. When the connection state has been changed for each access network, the access network is selected based on the access preference of the target traffic and the network and the UE may transmit/receive the traffic based on shared ATSSS rule.

When the Namf_Comm_N1N2MessageTransfer message is received by the AMF 310 in step S604, the AMF 310 transmits a Namf_comm_N1N2MessageResponse message including the inquiry result about the connection state of the terminal for the access network to the SMF 320 (S605). The inquiry result may be indicated in a cause field of the Namf_comm_N1N2MessageResponse message. When all accesses are in the CM_CONNECTED state, 'cause=SUCCESS' may be indicated, and steps S606 and S607 below may be omitted. When a preparation step is required because the target access network (i.e., the second access network 220 as the access network to which the traffic path is to be changed) is not connected, 'cause=reaching target AN' may be indicated, and then, steps S606 and S607 Step are performed.

After confirming the ATSSS_Indication included in the Namf_Comm_N1N2MessageTransfer received in step S604, the AMF 310 activates the control plane for the target access network related to the PDU session of the UE 100, thereby preparing the control message to be transmitted and received. The AMF 310 then activates the user plane for the target access network associated with the PDU session of the UE 100, thereby preparing the data traffic to be transmitted and received. When the control plane is activated in step S606 and the user plane is activated in step S607, the AMF 310 transmits the N1 message to the UE 100 in step S608 or S609 to perform the ATSSS.

When the connection of the UE 100 to the second access network 220 is inactivated, the AMF 310 activates the connection of the UE 100 for the second access network 200 using a service request (S606). In this embodiment, as an activation method for the connection state of the terminal with respect to the second access network 220 (i.e., transition from the CM_IDLE state to the CM_CONNECTED state), a Network Triggered Service Request Procedure may be used. The network triggered service request procedure is apparent to those skilled in the art, and therefore details are not described here.

Meanwhile, when the user plane of the UE 100 for the second access network 220 is in the inactive state, the user plane (UP, User Plane) is activated (S607). That is, the N3 tunnel is established between the second access network 220 and the UPF 330. The access network (AN) tunnel information, the CN (Core Network) tunnel information, the allowed QFI, and the QoS (Quality of Service) flow list information may be exchanged between the second access network 220 and the UPF 330. The activation method for the user plane will be apparent to those skilled in the art, and therefore, details are not described here.

After the control plane is activated in step S606 and the data plane (i.e., user plane) is activated in step S607, the AMF 310 transmits an N2 Session Request message to the second access network 220 or to the first access network 210 (S608, S609). The AMF 310 encodes the PDU session modification command received in step S604 into the N1 information, encodes the CN (Core Network) N3 tunnel information into the N2 information (N2 info), and inserts the N1 information and the N2 information into the N2 session request message. That is, the N2 session request message includes the PDU session modification command message and the CN N3 tunnel information. Further, the PDU session modification command message contains the changed (updated) ATSSS rules. In this case, the PDU session modification command message which includes the updated ATSSS rules (e.g., a path of the traffic flow is changed from the first access network 210 to the second access network 220) may be transferred to the UE 100 through the second access network 220 or through the first access network 210.

Next, the core network starts a PDU modification request procedure to perform a change of the PDU session for the ATSSS (S610). The PDU modification request procedure will be understood by those skilled in the art, and therefore details thereof are not described here. The updated ATSSS rules are applied between the first access network 210 and the UPF 330 through the PDU modification request procedure.

In order to apply the updated ATSSS rule to the N3 tunnel established between the second access network 220 and the UPF 330, an N4 session modification procedure is performed (S611). For example, the SMF 320 transmits an N4 Session Modification Request message to the UPF 330 and receives an N4 Session Modification Response message from the UPF 330. In this case, the SMF 320 generates the N4 rule to be mapped to the changed (updated) ATSSS rule, transmits the generated N4 rule to the UPF 330 through the N4 Session Modification Request message, and then receives a response corresponding to the N4 Session Modification Request message.

Figure 7:
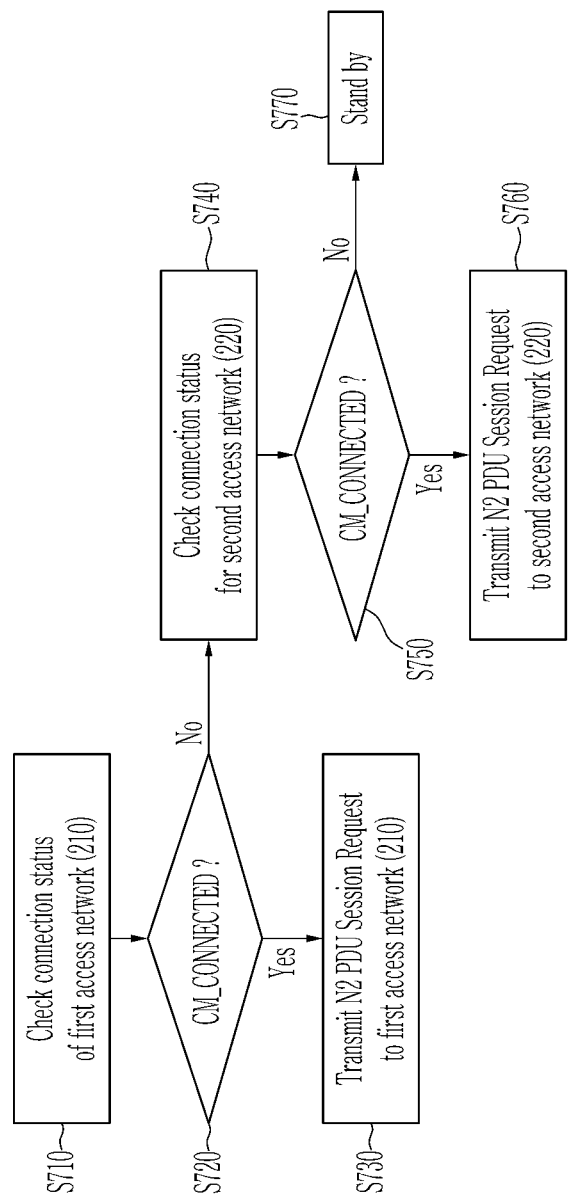
FIG. 7 is a flowchart illustrating an operation of the AMF 310 for the ATSSS according to the embodiment.

FIG. 7 is a flowchart illustrating an operation of the AMF 310 for the ATSSS according to the embodiment. Specifically, FIG. 7 illustrates the operation of the AMF 310 before the step of S608 or S609.

The AMF 310 inquires the connection management (CM) states of the source access network type and the target access network type included in the Namf_Comm_N1N2MessageTransfer message received in step S604. In other words, the AMF 310 inquires the connection states of the UE 100 for the first access network 210 and the second access network 220.

The AMF 310 confirms the connection state of the UE 100 for the first access network 210 (S710). When the UE 100 is in a CM_CONNECTED state on the first access network 210, the AMF 310 transmits an N2 PDU Session Request message to the first access network 210 as in step S609 (S720, S730).

The AMF 310 checks the connection state for the second access network 220 when the UE 100 is in a CM_IDLE state on the first access network 210 instead of the CM_CONNECTED state (S740). When the UE 100 is in the CM_CONNECTED state on the second access network 220, the AMF 310 transmits the N2 PDU Session Request message to the second access network 220 as in step S608 (S750, S760).

When both of the connection states for the first access network 210 and the second access network 220 are in the CM_IDLE state, the AMF 310 waits for the ATSSS operation until the control plane is activated (S770).

Figure 8:
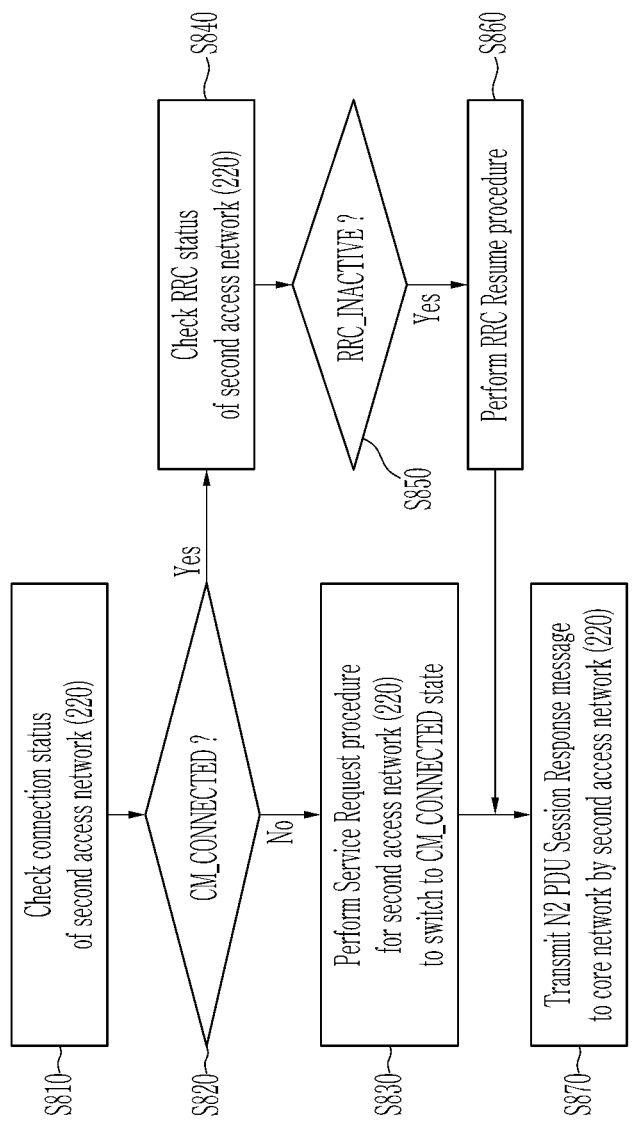
FIG. 8 is a flowchart illustrating an operation of the UE 100 for the ATSSS according to the embodiment.

FIG. 8 is a flowchart illustrating an operation of the UE 100 for the ATSSS according to the embodiment. Specifically, FIG. 8 is a diagram illustrating an operation method according to a connection state for an access network and a radio resource control state when the UE 100 receives a request for the ATSSS (e.g., in a case for receiving an N1 message after step S608 or S609 in FIG. 6).

When the UE 100 intends to switch the traffic route from the first access network 210 to the second access network 220, the UE 100 checks the connection state for the second access network 220 (S810).

When the UE 100 is not in the CM_CONNECTED state on the second access network 220 in step S810, the UE 100 performs a service request procedure for the second access network 220 to switching the connection state for the second access network to the CM_CONNECTED state (S820, S830).

When the UE 100 is in the CM_CONNECTED state on the second access network 220, the UE 100 confirms the RRC state of the second access network 220 (S820 and S840).

In step S840, when the UE 100 is in the RRC_INACTIVE state on the second access network, the UE 100 performs an RRC Resume procedure to switch to the RRC_ACTIVE state (S850 and S860).

When the UE 100 is in the CM_CONNECTED state on the second access network 220 and the RRC_ACTIVE state, the second access network 220 transmits an N2 PDU Session Response message to the core network (i.e., the AMF 310) (S870). In this case, access tunnel information (AN tunnel info.) of the first and second access networks 210 and 220 is also transferred. The N2 PDU session response is a response message corresponding to the N2 Session Request transmitted in step S608 or S609, and is transmitted in step S610.

Figure 9:
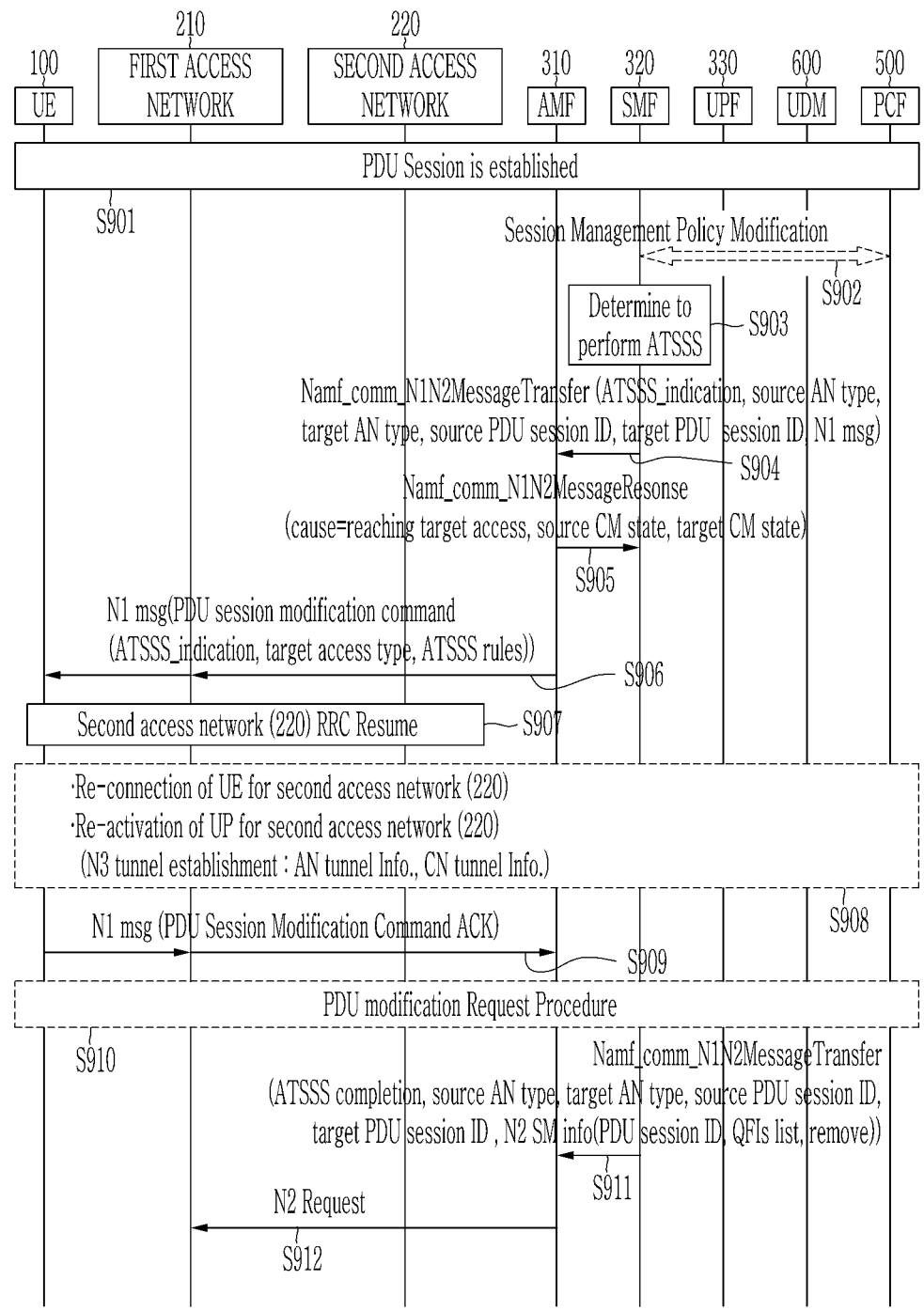
FIG. 9 is a flowchart illustrating an ATSSS method according to a second embodiment.

FIG. 9 is a flowchart illustrating an ATSSS method according to a second embodiment.

The ATSSS method of FIG. 9 is similar to the ATSSS method of FIG. 6, but differs in the manner in which the AMF 310 processes the PDU session modification command message. In FIG. 6, the AMF 310 activates the control plane and user plane of the UE 100 after receiving the N1 message (i.e., the PDU Session Modification Command) from the SMF 320, and thereafter transmits the N1 message to the UE 100. However, in FIG. 9, the AMF 310 immediately transmits an N1 message to the UE 100 after receiving the N1 message from the SMF 320, and after that, the UE 100 activates the control plane and the user plane. In addition, in FIG. 9, the UE 100 responds to the SMF 320 with the PDU session modification command Ack, and the SMF 320 requests the UPF 330 to modify the ATSSS rule and the AN (Access Network) tunnel information for the second access network. The ATSSS method of FIG. 9 will be described in more detail below.

First, it is assumed that a PDU session is established through a PDU session establishment procedure (S901). That is, the UE 100 may establish a PDU session through the first access network 210 and the second access networks 220, and this PDU session may be the MA PDU session.

The session management policy modification may be performed by the PCF 500 or the UDM 600 (S902). The following step S903 may be performed by means of the session management policy modification.

The SMF 320 determines to perform the ATSSS (S903). There are various conditions under which the SMF 320 determines to perform the ATSSS. The SMF 320 may determine to perform the ATSSS when a monitored load on an access network exceeds a predetermined threshold. The SMF 320 may determine to perform the ATSSS when it is requested to update the ATSSS rule from the PCF 500 or the UDM 600 in step S902. When the downlink traffic arrives at the UPF 330 from the DN 400 but the PDU session is not in the CM_CONNECTED state on the first access network 210, the SMF 320 may determine to perform the ATSSS for transmitting the downlink traffic by changing the access network to the second access network 220.

In FIG. 9, for convenience of explanation, it is assumed that the SMF 320 determines to perform the ATSSS by changing from the first access network 210 to the second access network 220.

When the SMF 320 determines to perform the ATSSS in step S903, the SMF 320 transmits a Namf_Comm_N1N2MessageTransfer message to the AMF 310 (S904). In this case, the Namf_Comm_N1N2MessageTransfer message may include the ATSSS_indication, the source access network type (source AN type), the target access network type (target AN type), the source PDU session ID, the target PDU session ID, and the N1 message. The ATSSS_indication is an indicator for instructing the AMF 310 to prepare the access for each access network before starting the ATSSS. The source PDU session ID and the target PDU session ID may indicate the PDU session information for which the ATSSS is to be performed. This PDU session information may be one MA PDU session ID, and may be a source PDU session ID and a target PDU session ID. The source access network type may be set to a first access network (3GPP access network) and the target access network type may be set to a second access network (Non-3GPP access network). The N1 message may be a PDU session modification command message. The PDU session modification command message may include the ATSSS_indication for instructing the UE 100 to activate the target access network which is in the inactive state, the target access type indicating the second access network 220 on which the UE 100 is in the CM_IDLE state, and ATSSS rules that indicate updated access traffic and routes.

In step S905, the AMF 310 transmits a Namf_comm_N1N2MessageResponse message to the SMF 320 in response to the Namf_Comm_N1N2MessageTransfer message received in step S904. The Namf_comm_N1N2MessageResponse message may include a cause field, a source CM state field, and a target CM state field. When the UE 100 is connectable on all access networks, 'cause=SUCCESS' may be set. When the target access network is not connectable, 'cause=reaching target access' may be set. In the source CM status field, the connection state for the first access network 210 related to the PDU session of the UE 100 may be set, and the connection state for the second access network 220 may be set in the target CM state field.

The AMF 310 transmits the N1 message (PDU session modification command message) to the first access network 210 and the first access network 210 transmits the N1 message (PDU session modification command message) to the UE 100 (S906). The UE 100 activates the control plane of the target access network (i.e., the second access network) corresponding to the target access type when the PDU session modification command message includes the ATSSS_indication field. In this case, the activation process may be performed differently depending on the connection state of the UE 100 on the second access network 220. When the UE 100 is in the CM_CONNECTED state on the second access network and the RRC status thereof is in the RRC_ACTIVE state, steps S907 and S908 below may be omitted and step S909 is performed. When the UE 100 is in the CM_CONNECTED state and the RRC_INACTIVE state on the second access network 200, the following step S907 is performed. When the UE 100 is in the CM_IDLE state on the second access network 220, the following step S908 is performed.

When the UE 100 is in the CM_CONNECTED state and the RRC_INACTIVE state on the second access network 200, the UE 100 performs an RRC resume procedure (S907). The RRC resume procedure is known to those skilled in the art and will not be described in detail.

When the UE 100 is in the CM_IDLE on the second access network 200, the UE 100 performs a service request procedure to reconnect to the second access network 200 (S908). The service request procedure is a UE Triggered Service Request procedure, and it will be apparent to those skilled in the art. The AMF 310 would be informed the location of the UE 100 in the second access network 220 by means of the service request procedure and the control signal may be transmitted and received because the UE 100 is in the CM_CONNECTED state on the second access network 220. That is, the control plane is activated by the service request procedure. After the control plane is activated, a user plane re-activation process for the second access network 220 is performed (S908). In the user plane reactivation process, radio resources between the UE 100 and the second access network 220 are configured, and an N3 tunnel between the second access network 220 and the UPF 330 is established.

The UE 100 transmits an N1 message (PDU session modification command ACK) to the AMF 310 through the first access network 210 (S909).

Next, the AMF 310 performs procedures after step S909 in the PDU modification request procedure to change the PDU session for the ATSSS (S910). That is, in order for the updated ATSSS rule to be applied to the UPF 330, the SMF 320 transmits an N4 Session Modification Request message to the UPF 330 to transmit a forwarding rule of the user traffic to the UPF 330. The N4 Session Modification Request message may include the forwarding rule (PDR (Packet Detection Rule={IP 5 tuple set}) of the traffic which is used to change the access network and the N4 session ID associated with the PDU session ID.

The SMF 320 transmits a Namf_comm_N1N2MessageTransfer message to the AMF 310 (S911). The Namf_comm_N1N2MessageTransfer message may include an ATSSS completion which is an indicator that the ATSSS signaling procedure has been completed. The Namf_comm_N1N2MessageTransfer message may further include a source access network type (source AN type), a target access network type (target AN type), a source PDU session ID, a target PDU session ID, and N2 SM (Session Management) information. The N2 SM information may include a PDU session ID, a quality of service flow identifier (QFI), and a remove instruction indicator.

The AMF 310 transmits an N2 request message including the N2 SM information received in step S910 to the first access network 210 (S912). The first access network 210 removes the QFI list from the PDU session ID and releases the resources allocated thereto by using uses the received N2 SM information. That is, the first access network 210 changes resources of the first access network 210 using the N2 SM information received in step S912.

Figure 10:
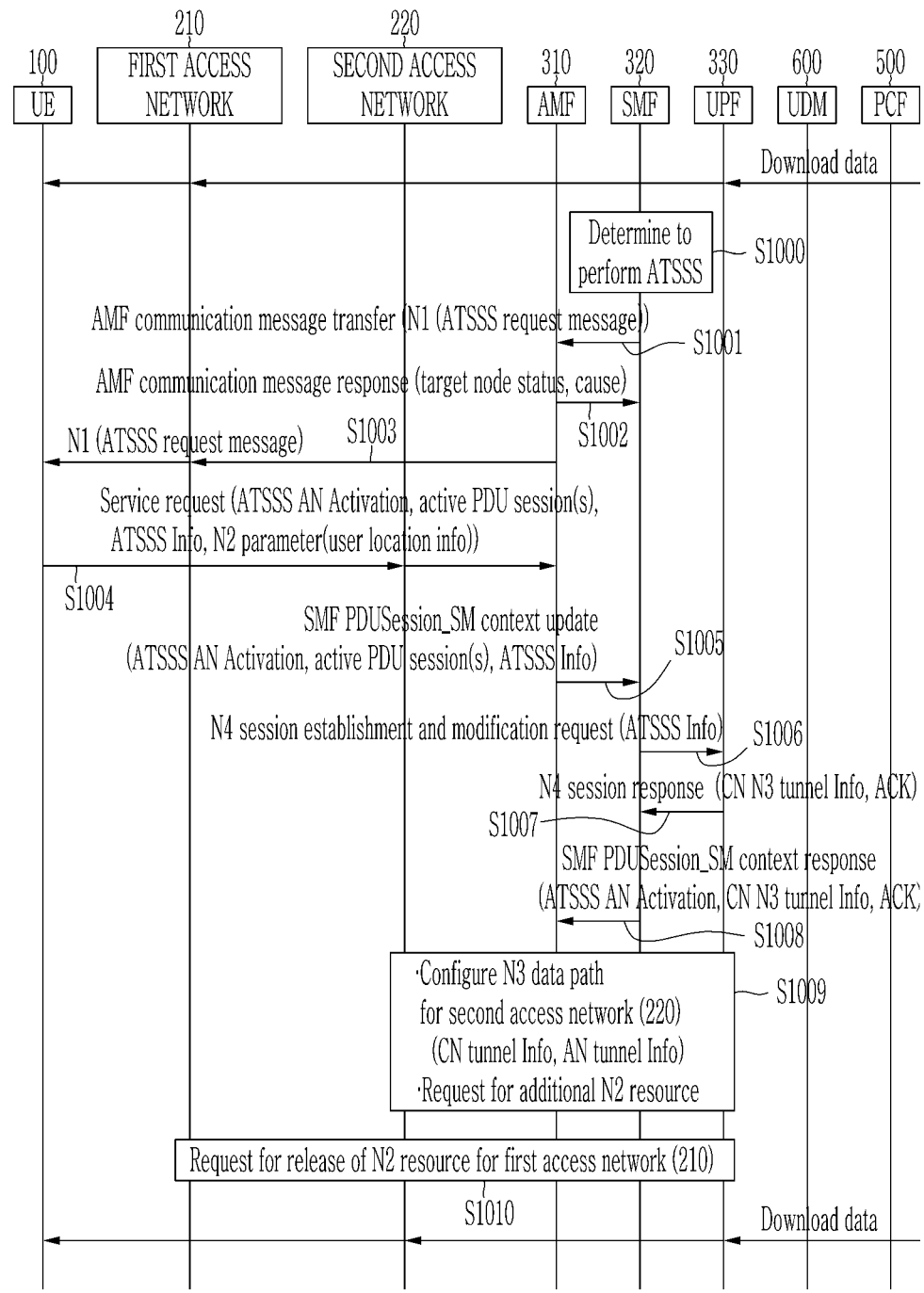
FIG. 10 is a flowchart illustrating an ATSSS method according to a third embodiment.

FIG. 10 is a flowchart illustrating an ATSSS method according to a third embodiment.

In FIG. 10, the data forwarding rule modification function of the UPF 330 based on the updated ATSSS rules in the access control activation procedure by the service request procedure is also performed. When the AMF 310 receives the service request for activating the second access network 220, the SMF 320 requests the UPF 330 to establish and modify the N4 session. The ATSSS method of FIG. 10 may omit the PDU session modification procedure in the ATSSS method of FIG. 9.

One of the functions of the core network, for example, SMF 320, determines to perform the ATSSS (S1000). That is, as shown in FIG. 6 or FIG. 9, the PCF 500, the UDM 600, or the SMF 320 may determine to perform the ATSSS.

The SMF 320 determines to service by changing traffics on the first access network 210 to the second access network 220, configures an N1 message for an ATSSS request, and invokes the AMF 310 by sending the N1 message through the AMF communication message transfer (S1001). The AMF communication message transfer may be a Namf_Comm_N1N2MessageTransfer message, and the Namf_Comm_N1N2MessageTransfer message may include a PDU session modification command message as an ATSSS request message.

When receiving the AMF communication message transfer from the SMF 320, the AMF 310 confirms the connection state of the UE 100 to the second access network 220. When the UE 100 is in the CM_IDLE state on the second access network 220, the AMF 310 writes on the cause field that the AMF 310 is being reached the UE 100 on the second access network 220 and transmits the cause to the SMF 320 with the connection state on the target access network (S1002). That is, the AMF 310 transmits an AMF communication message response to the SMF 320. The AMF communication message response may be the Namf_comm_N1N2MessageResponse message, and the Namf_comm_N1N2MessageResponse message may include the cause field and a field indicating the connection state of the UE 100 on the target access network.

The AMF 310 transmits an N1 message for the ATSSS request to the UE 100 via the first access network 210 (S1003). The N1 message may be a PDU session modification command message, and the PDU session modification command message may include a source access network type (AN type), a target access network type (target AN type) A source PDU session ID, a target PDU session ID, ATSSS information, and a cause.

The UE 100 transmits a service request message to the AMF 310 through the second access network 220 when the UE 100 is in the CM_IDLE state on the second access network 220 (S1004). The service request message includes new PDU session information (target PDU session or active PDU session) associated with traffic to be transmitted. The service request message may further include an ATSSS AN (access network) Activation indicator, ATSSS information, and N2 parameter (user location information). The ATSSS information may be composed of the access traffic information (SDF (Service Data Flow)), the source PDU session ID, the target PDU session ID, the source access network type, the target access network type, and the ATSSS path rule.

When receiving the service request message in step S1004, the AMF 310 transmits an SMF PDUSession_SM (Session Management) context update message to the SMF 320 (S1005). The SMF PDUSession_SM context update message may be a Nsmf_PDUsession_UpdateSM context message. The Nsmf_PDUsession_UpdateSMcontext message may include an ATSSS AN activation indicator, an active PDU session, and ATSSS information included in the service request message.

The SMF 320 applies the updated ATSSS rule and transmits an N4 session establishment and modification request message to the UPF 330 (S1006). The UPF 330 modifies the transmission path (i.e., access network, N3 tunnel information, AN tunnel information, CN tunnel information, and the like) for the specified traffic.

The UPF 330 allocates a CN (Core Network) tunnel of the N3 interface for the target PDU session associated with the second access network 220 and transmits an N4 session response message to the SMF 320 (S1007). The N4 session response message includes the CN N3 tunnel information and the ACK.

In response to the step S1005, the SMF 320 transmits an SMF PDUSession_SM context response message to the AMF 310 (S1008). The SMF PDUSession_SM context response message may include an ATSSS AN Activation indicator, a CN N3 tunnel information of the N3 tunnel, and an ACK. The SMF PDUSession_SM context response message may be the Nsmf_PDUsession_UpdateSMcontext Response message.

By steps S1004 to S1008, the control plane including the second access network 220 is activated.

Next, the N3 data path including the second access network 220 is established (S1009). That is, the second access network 220 receives the CN tunnel information (CN N3 tunnel info) allocated by the UPF 330 and allocates an AN tunnel corresponding to the CN tunnel. The second access network 220 configures AN tunnel information about the allocated AN tunnel and transmits the AN tunnel information to the UPF 330. Then, an N2 resource addition request is performed (S1009). That is, a modification for the QFI resources added in response to the updated ATSSS PDU session is requested to the second access network 220.

Meanwhile, an N2 resource release request for the first access network 210 is performed (S1010). That is, modifications for the QFI resources that have been deleted or modified in response to the updated ATSSS PDU session are requested to the first access network 210.

According to the embodiments, the ATSSS can be effectively performed by switching the connection state for the access network associated with the ATSSS to the active state.

Figure 11:
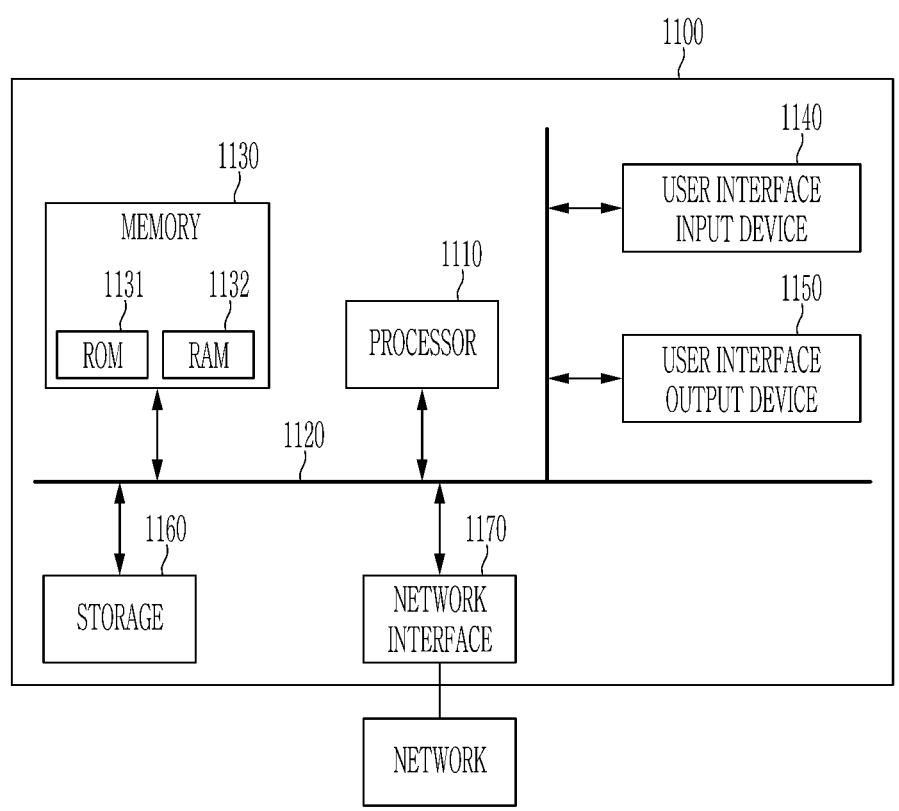
FIG. 11 is a diagram illustrating a computing system according to an embodiment.

FIG. 11 is a diagram illustrating a computing system according to an embodiment.

The computing system 1100 of FIG. 11 may be a terminal 100, an access network 200, an AMF 310, an SMF 320, a UPF 330, a DN 400, a PCF 500, or a UDM 600 of FIG. 1. The terminal 100, the access network 200, the AMF 310, the SMF 320, the UPF 330, the DN 400, the PCF 500, or the UDM 600 may be implemented by a computer system, for example, computer readable medium.

The computer system 1100 includes at least one of a processor 1110, a memory 1130, a user interface input device 1140, a user interface output device 1150, and a storage 1160 that communicate via a bus 1120. The computer system 1100 may also include a network interface 1170 coupled to the network. The network interface 1170 may transmit and receive signals with other entities over the network.

The processor 1110 may be a central processing unit (CPU) or a semiconductor device that executes instructions stored in the memory 1130 or storage 1160. The processor 1110 may be configured to implement the functions and methods described in FIGS. 1 to 10.

The memory 1130 and the storage 1160 may include various forms of volatile or non-volatile storage media. For example, the memory may include a read only memory (ROM) 1131 and a random access memory (RAM) 1132. In an embodiment, the memory 1130 may be located inside or outside the processor 1110, and the memory 1130 may be coupled to the processor 1110 through various means already known.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for performing ATSSS (Access Traffic Steering, Switching and Splitting) in a network, comprising:
   transmitting, by a session management function (SMF), a first message for checking a connection state of a terminal for a first access network and a second access network to an access and mobility management function (AMF) when an execution of the ATSSS from the first access network to the second access network is determined; and
   receiving, by the SMF, information on the connection state of the terminal from the AMF;
   wherein the receiving comprises receiving, by the SMF from the AMF, an Network Interface AMF Communication N1N2 Message (Namf comm N1N2Message) response message including the information.

2. The method of claim 1,
   wherein when the connection state for the second access network is a CM (Connection Management) _IDLE state, a control plane for the second access network is activated; and
   a user plane for the second access network is activated after the control plane is activated.

3. The method of claim 2, further comprising
   performing a modification of a packet data unit (PDU) session for the ATSSS.

4. The method of claim 1,
   wherein the first message includes a packet data unit (PDU) session modification command message, and the PDU session modification command message includes an updated ATSSS rule.

5. The method of claim 4,
   wherein when the connection state for the second access network is a CM (Connection Management) _IDLE state, a control plane for the second access network is activated and a user plane for the second access network is activated after the control plane is activated, and the method further comprises
   transmitting, by the AMF, an N2 Session Request message including the PDU Session Modification command message to the first access network or the second access network.

6. The method of claim 4, further comprising
   sending, by the AMF through the first access network, the PDU session modification command message to the terminal.

7. The method of claim 6,
   wherein the PDU session modification command message includes an indicator indicating the ATSSS and the updated ATSSS rule.

8. The method of claim 6, further comprising
   performing, by the terminal, a radio resource control (RRC) resume procedure when the connection state for the second access network is a CM (Connection Management) _CONNECTED state and an RRC state of the second access network is an RRC_INACTIVE state.

9. The method of claim 6, further comprising
   performing, by the terminal, a re-connection for the second access network when the connection state for the second access network is a CM_IDLE state.

10. The method of claim 9, further comprising
    transmitting, by the terminal, a PDU Session Modification Request acknowledgment (ACK) message to the AMF.

11. The method of claim 4,
    wherein the first message further includes at least one of an indicator indicating the checking of the connection state, a type of the first access network, a type of the second access network, and a PDU session identifier (ID) associated with the ATSSS.

12. The method of claim 4,
    wherein the first message is an Namf_Comm_N1N2MessageTransfer message.

13. A method for performing ATSSS (Access Traffic Steering, Switching and Splitting) in a network, comprising:
    determining that a Session Management Function (SMF) changes a traffic of a first access network to a second access network for the ATSSS,
    transmitting, by the SMF, a second message including a first message for the ATSSS request to an Access and Mobility Management Function (AMF); and
    receiving, by the SMF, information on a connection state for the terminal from the AMF;
    wherein the receiving comprises receiving, by the SMF from the AMF, an Network Interface AMF Communication N1N2 Message (Namf comm N1N2Message) response message including the information.

14. The method of claim 13, further comprising:
    transmitting, by the AMF, the first message to the terminal through the first access network.

15. The method of claim 14, further comprising:
    transmitting, by the terminal, a service request message to the AMF through the second access network when a connection state of the terminal to the second access network is a CM (Connection Management) _IDLE state.

16. The method of claim 13,
    wherein the first message is a packet data unit (PDU) session modification command message, and
    the PDU session modification command message includes at least one of a type of the first access network, a type of the second access network, and a PDU identifier associated with the ATSSS.

17. A network entity for performing ATSSS (Access Traffic Steering, Switching and Splitting) in a network, comprising:
    a processor configured to determine a performance for the ATSSS and configure a first message requesting checking of a connection state of a terminal to an access network associated with the ATSSS, and
    a network interface configured to transmit the first message to another network entity in the network and receive information on the connection state of the terminal from the other network entity,
    wherein the first message is an Network Interface AMF Communication N1N2 Message Transfer (Namf comm N1N2MessageTransfer) message, the Network Interface AMF Communication N1N2 Message Transfer (Namf comm N1N2MessageTransfer) message includes a PDU session modification command message, and the PDU session modification command message includes an updated ATSSS rule.

18. The network entity of claim 17,
wherein the network entity is a Session Management Function (SMF), and the other network entity is an Access and Mobility Management Function (AMF).

* * * * *